(12) United States Patent
Chou

(10) Patent No.: US 10,216,298 B2
(45) Date of Patent: Feb. 26, 2019

(54) LIGHT MODULE AND ILLUMINANT MOUSE PAD

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 43 days.

(21) Appl. No.: 15/603,459

(22) Filed: May 24, 2017

(65) Prior Publication Data

US 2018/0224953 A1    Aug. 9, 2018

(30) Foreign Application Priority Data

Feb. 7, 2017 (TW) .............................. 106201782 U

(51) Int. Cl.
*F21V 8/00* (2006.01)
*G06F 3/039* (2013.01)

(52) U.S. Cl.
CPC ......... *G06F 3/0395* (2013.01); *G02B 6/0021* (2013.01); *G02B 6/0045* (2013.01); *G02B 6/0055* (2013.01)

(58) Field of Classification Search
CPC ... G06F 3/0395; G02B 6/0055; G02B 6/0021; G02B 6/0045
See application file for complete search history.

(56) References Cited

U.S. PATENT DOCUMENTS 7,287,892 B1 * 10/2007 Pang .................... G02B 6/0021
362/560

* cited by examiner

*Primary Examiner* — Thomas M Sember
(74) *Attorney, Agent, or Firm* — Chun-Ming Shih; HDLS IPR Services

(57) ABSTRACT

A lighting module and an illuminant mouse pad are disclosed. The lighting module includes a plurality of point light sources and a light guide plate; the light guide plate includes a light-emitting section, a light incident section, and a light-reflecting section, the light-reflecting section is connected to the light-emitting section and the light incident section and has a light-reflecting surface; light beams from the point light sources are incident to the light guide plate through the light incident section and emitted out from a light-emitting surface of the light-emitting section after the light beams are conveyed by the light-reflecting surface. The illuminant mouse pad includes the lighting module abovementioned, a base, and a mat; the base includes a receiving part for accommodating the lighting module, and the mat partially covers the lighting module and exposes the light-emitting surface.

11 Claims, 7 Drawing Sheets

LIGHT MODULE AND ILLUMINANT MOUSE PAD

BACKGROUND

Technical Field

The present disclosure relates to a lighting module and a mouse pad. More particularly, the present disclosure relates to an illuminant mouse pad.

Description of Related Art

Generally, a mouse pad allows the mouse to work quickly and accurately. Optical mice have the advantages of higher sensitivity, greater durability, easier maintenance, and more options for applicable materials and are widely used. However, not all mouse pads are suitable for optical mice, because an optical mouse works by reflecting a light off the surface the mouse rests on and a photo-sensor picks up the reflection of that light and uses the information to calculate where the mouse is moving and how far it has moved. Therefore, factors such as the surface roughness of the mouse pad and the material of the mouse pad may affect the use of the optical mouse and further affect the performance of the computer.

In addition, the mouse pad which is presently available includes soft mouse pads, and hard mouse pads; some manufacture now are trying to develop a mouse pad with an illuminant module, such as a light emitting diode (LED) or a cold cathode fluorescent lamp (CCFL). Different arrangements of the illuminating module and emitting pattern will able to improve the visual reception. However, a hot spot phenomenon occurs in the illuminant mouse pad presently available in areas where light beam emitted from the LED or CCFL.

SUMMARY

According to one aspect of the present disclosure, a lighting module includes a plurality of point light sources and a light guide plate having a light-emitting section, a light incident section, and a light-reflecting section. The light-reflecting section is connected to the light-emitting section and the light incident section and comprises a light-reflecting surface; light beams from the point light sources are incident to the light guide plate through the light incident section and emitted out from a light-emitting surface of the light-emitting section after the light beams are conveyed by the light-reflecting surface.

In an embodiment of the present disclosure, an included angle between the light

In an embodiment of the present disclosure, the light incident section includes a plurality light incident surfaces, the point light sources are disposed adjacent to the light incident surfaces, and a normal line of each light incident surfaces is disposed in respective orientation perpendicular to a normal line of the light-emitting surface.

In an embodiment of the present disclosure, the light incident surfaces comprise a plurality of microstructures.

In an embodiment of the present disclosure, the light incident section further comprises a plurality of perforated portions, the point light sources are disposed within the perforated portions, and a sidewall of each perforated portion is the light incident surface.

In an embodiment of the present disclosure, the perforated portions are arranged in an annular shape on a center of the light incident section.

In an embodiment of the present disclosure, the light incident section further comprises a plurality of slots, and each slot is disposed between two adjacent perforated portions.

In an embodiment of the present disclosure, lengths of the slots are increased when distances between the light incident surface and the light-emitting section increases.

In an embodiment of the present disclosure, at least one of the light-emitting surface and the light-reflecting surface comprising a textured structure.

In an embodiment of the present disclosure, the light-reflecting section further comprises a light-deflecting surface facing the light-emitting surface, the light-reflecting surface faces the light incident surface, light beams from the point light sources are incident to the light incident section and emitted out from the light-emitting surface after light beams are conveyed by the light-reflecting surface and the light-deflecting surface accordingly.

In an embodiment of the present disclosure, a texture structure is formed on the light-deflecting surface.

According to another aspect of the present disclosure, an illuminant mouse pad includes the lighting module mentioned above, a base, and a mat, the base includes a receiving part for accommodating the lighting module, the may partially covers the lighting module and the light-emitting surface of the light guide plate exposes to the mat.

In an embodiment of the present disclosure, an upper surface of the mat and the light-emitting surface of the light guide plate are substantially at the same horizontal level.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
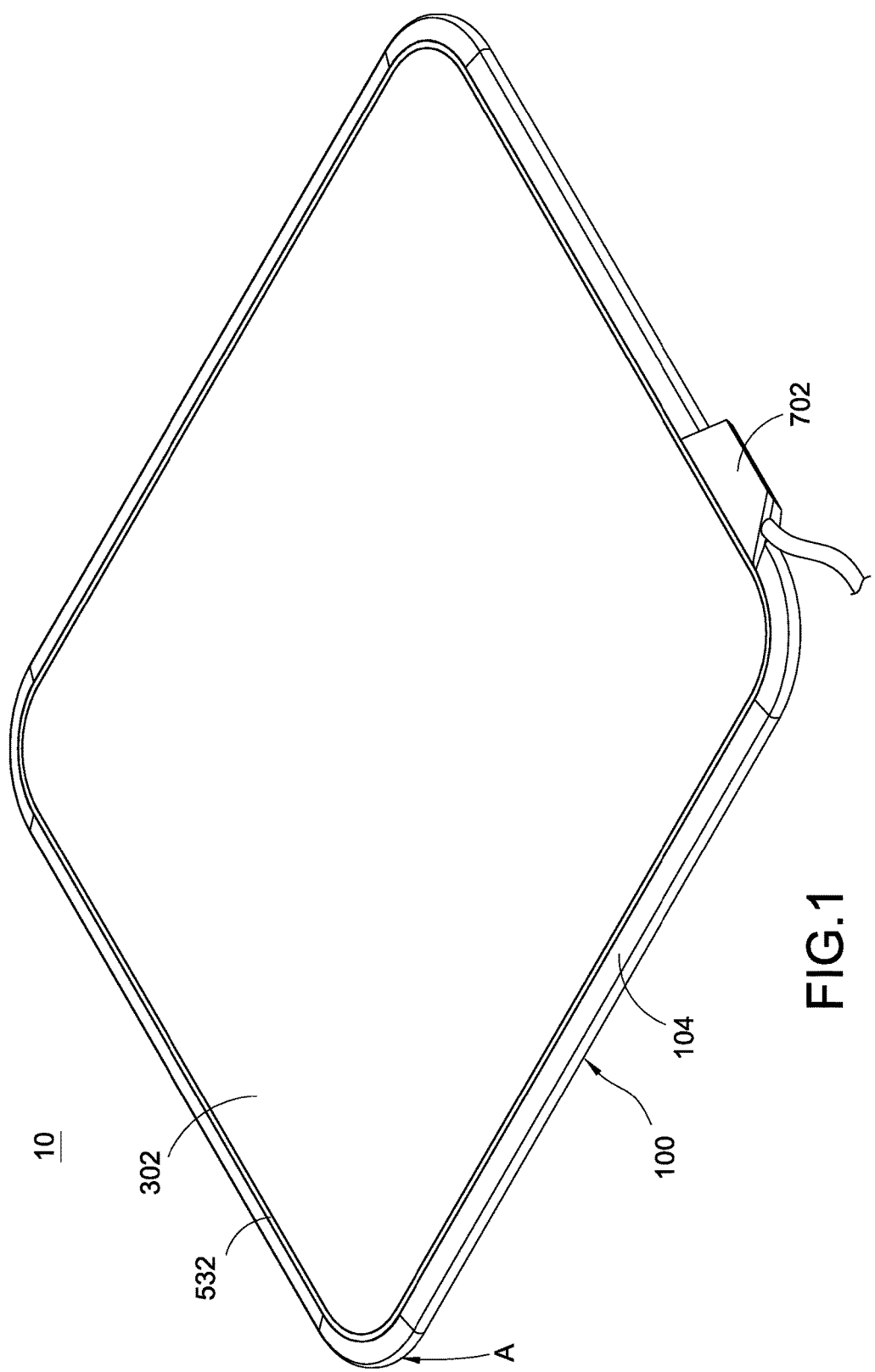
FIG. 1 is a perspective view of an illuminant mouse pad according to a 1st embodiment of the present disclosure.
Figure 2:
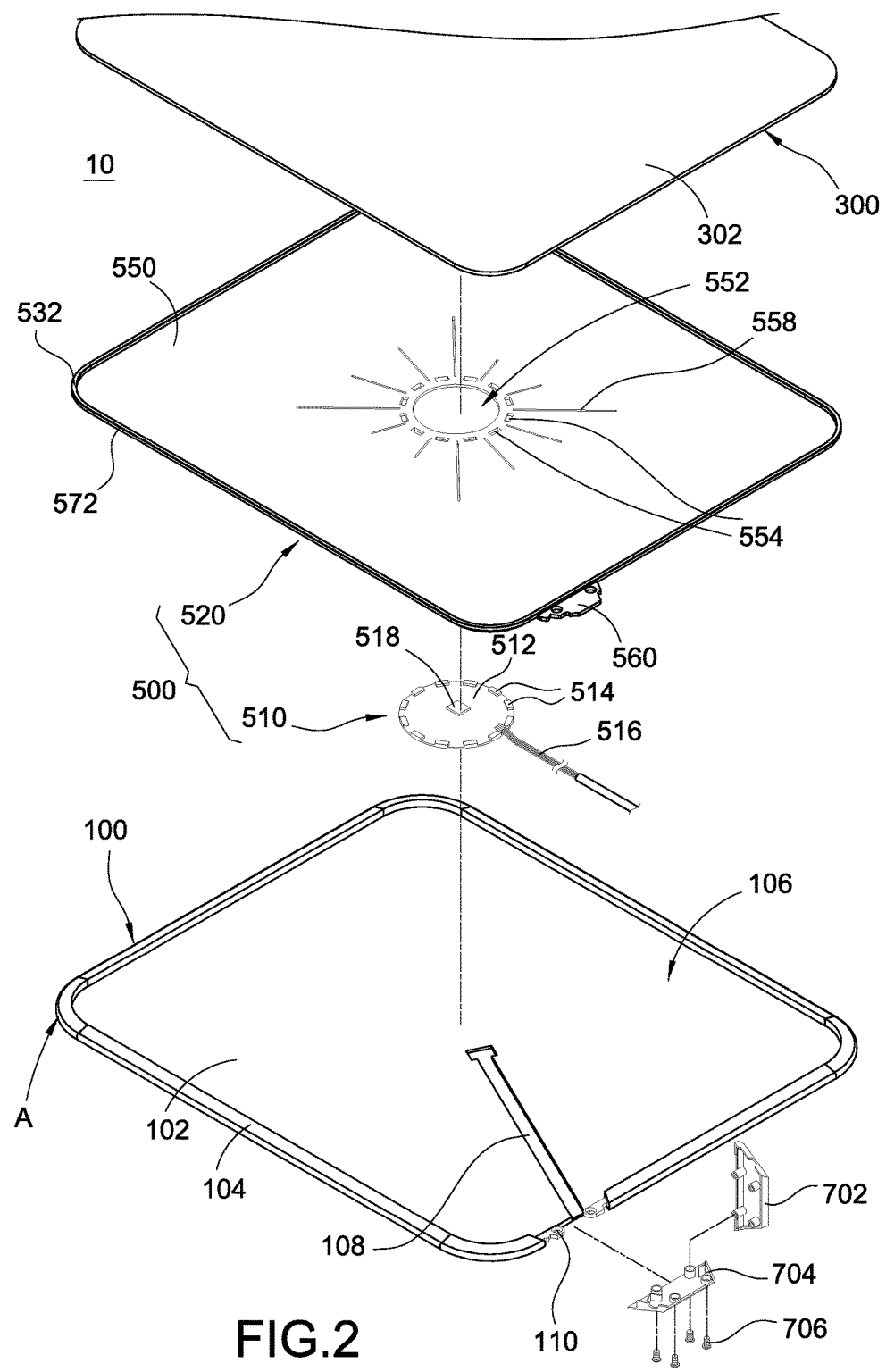
FIG. 2 is an exploded view of the illuminant mouse pad according to the 1st embodiment of the present disclosure.

FIG. 1 is a perspective view of an illuminant mouse pad according to a 1st embodiment of the present disclosure, FIG. 2 is an explored view of the illuminant mouse pad according to the 1st embodiment of the present disclosure.

In FIG. 1 and FIG. 2, the illuminant mouse pad 10 includes a base 100, a mat 300, and a lighting module 500.

The base 100 includes a bottom surface 102 having a rectangular shape and a plurality of chamfers A formed on corners of the bottom surface 102. The base 100 further includes an extending section 104 extends vertically from the edge of the bottom surface 102. The bottom surface 102 and the extending section 104 commonly define a receiving part 106 for accommodating the mat 300 and the lighting module 500. The base 100 made of plastic, silicone or rubber is formed by a compression molding technique.

Figure 3:
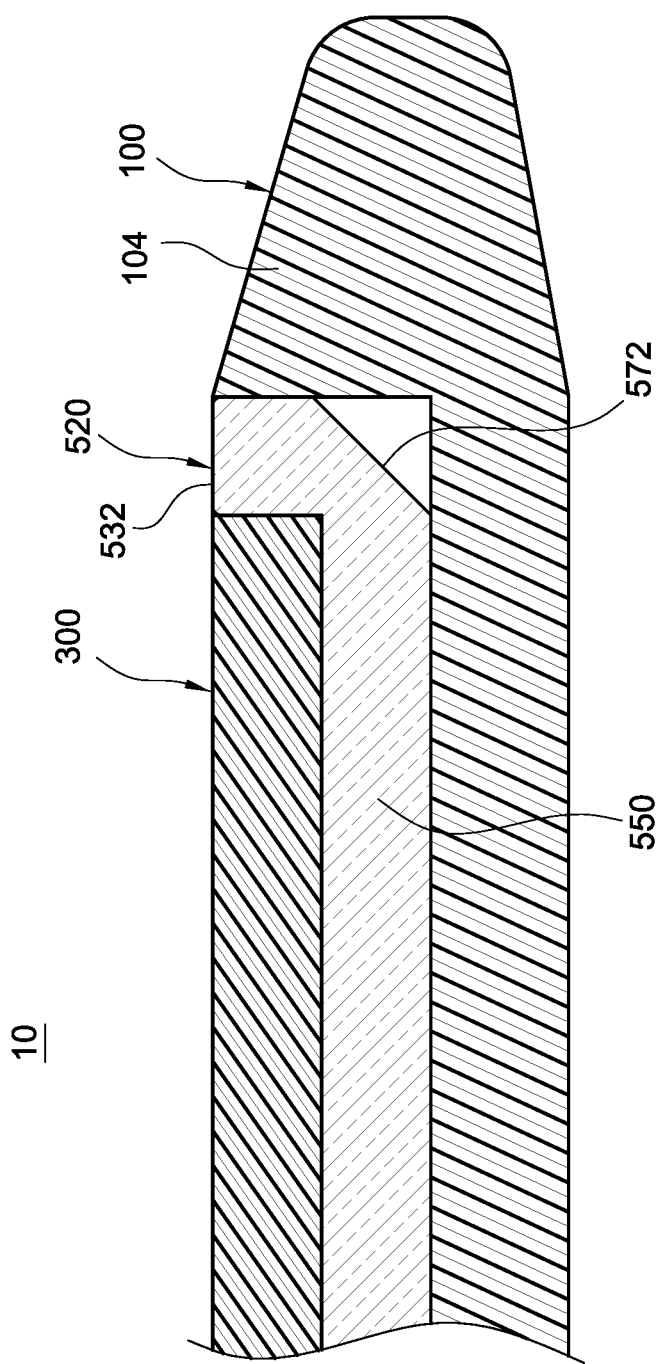
FIG. 3 is a sectional view of the illuminant mouse pad according to the 1st embodiment of the present disclosure.

The shape of the mat 300 is similar to that of the base 100 (i.e., the mat 300 also has a rectangular shape), and may be made of plastic, silicone, rubber, or sponge. The lighting module 500 is arranged between the base 100 and the mat 300 and partially exposes to the mat 300 (as shown in FIG. 3), such that a ring-like illuminant is provided when the illuminant mouse pad 10 receives an external power (as discussed in greater detail below).

The lighting module 500 includes an illuminant unit 510 and a light guide plate 520; the illuminant unit 510 includes a substrate 512 and a plurality of point light sources 514 mounted on the substrate 512. The substrate 512 may be a printed circuit board (PCB) or a metal core printed circuit board (MCPCB); wherein the MCPCB is formed by bonding a circuit board body and a metal substrate, such as aluminum, copper, or iron, in order to increase thermal conduction performance. In FIG. 2, the substrate 512 is a circular substrate; however, in the practical application, the shape of the substrate 512 may be, for example, a polygonal substrate.

The point light sources 514 are, for example, light emitting diodes (LEDs) and mounted on the substrate 512 in an annular arrangement. Each point light source 514 is equal-angularly spaced from its two adjacent point light sources 514, hence light beams from the point light sources 514 may cover all of the light incident section 550 of the light guide plate 520.

The lighting module 500 may conduct an electric power to a driving circuit 518 for driving the point light sources 514 via a flexible PCB 516; notably, the driving circuit 518 can drive one or more point light source 514. The flexible PCB 516 is accommodated within a recess 108 formed on the bottom surface 102 of the base 100.

The light guide plate 520 is an optically transparent plate and usually made of a clear transparent material such as polymethylmethacrylate (PMMA) or polycarbonate (PC). However, in the practical applications, the material of the light guide plate 520 may be selected from the group consisting of acrylic resin, cyclic olefin copolymer (COC), PMMA, PC, polyetherimide, fluorocarbon polymer, and silicone.

Figure 4:
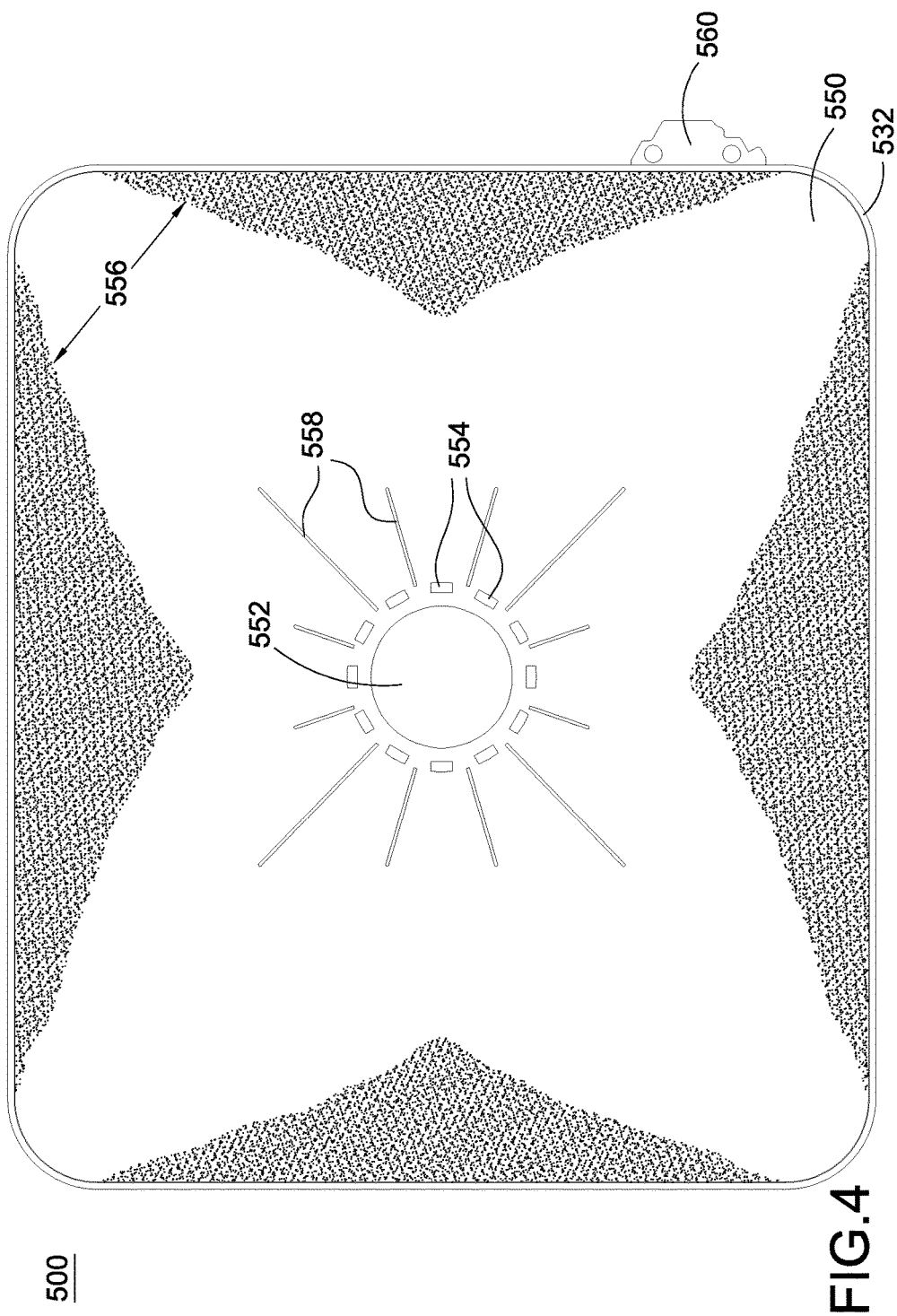
FIG. 4 is a top view of a light guide plate according to the 1st embodiment of the present disclosure.
Figure 5:
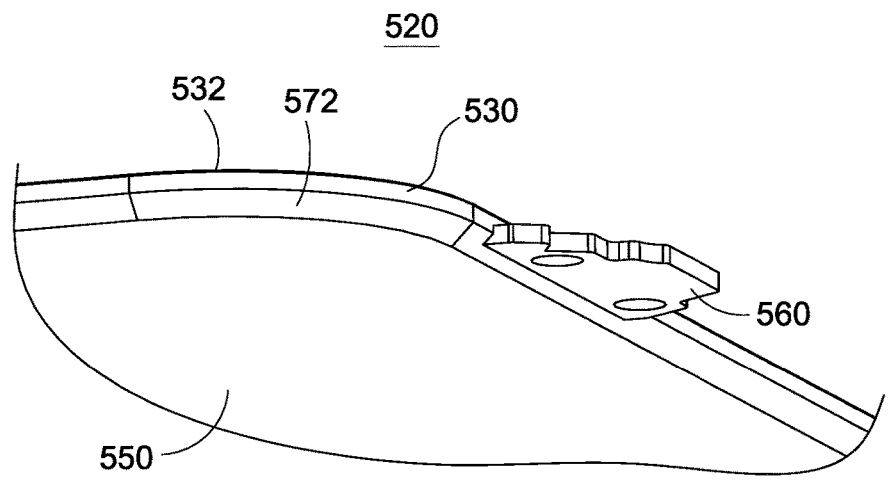
FIG. 5 is a partially enlarged view of the light guide plate according to the 1st embodiment of the present disclosure.
Figure 6:
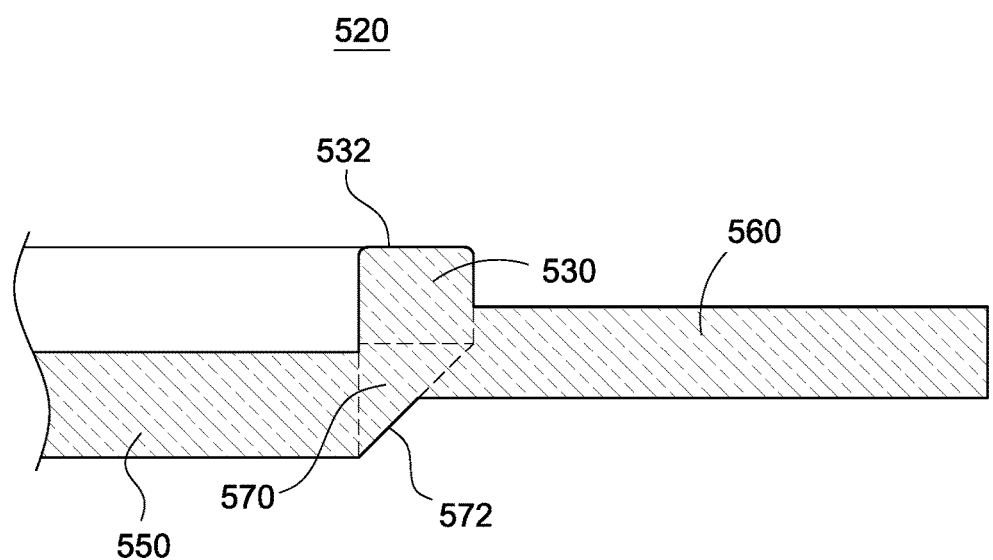
FIG. 6 is a sectional view of the light guide plate according to the 1st embodiment of the present disclosure.

FIG. 4 is a top view of the light guide plate according to the 1st embodiment of the present disclosure; FIG. 5 is a partially enlarged view of the light guide plate according to the 1st embodiment of the present disclosure; FIG. 6 is a partially sectional view of the light guide plate according to the 1st embodiment of the present disclosure. The light guide plate 520 includes a light-emitting section 530, a light incident section 550, and a light-reflecting section 570; the light-reflecting section 570 is arranged between the light-emitting section 530 and the light incident section 550 and connected to the light-emitting section 530 and the light incident section 550. The light-emitting section 530, the light incident section 550, and the light-reflecting section 570 may be integrally formed. The mat 300 and the lighting module 500 are assembled with the base 100, and the mat 300 partially covers the lighting module 500. More particularly, the mat 300 covers the illuminant unit 510 and the light incident section 530 of the light guide plate 520, and a light-emitting surface 532 of the light-emitting section 530 is exposed to the mat 300. As can be shown in FIG. 3, an upper surface 302 of the mat 300 and the light-emitting surface 532 of the light-emitting section 530 are substantially at the same horizontal level.

The light incident section 550 includes an opening 552 from on a center thereof for accommodating the illuminant unit 510. As can be seen in FIG. 4, the operating 552 perforates through the light incident section 550 and is in a shape of circle. In practical applications, the shape of the opening 552 may be varied according to a shape of the substrate 512, and the shape of the substrate 512 may be in a shape of polygon when the substrate 512 is in the shape of polygon. The light incident section 550 further includes a plurality of perforated portions 554 arranged in an annular shape and surrounding the opening 552; each perforated portion 544 is equal-angularly spaced from its two adjacent perforated portions 554. The point light sources 514 are disposed within the perforated portions 554 and a light incident surface for receiving light beams from each point light source 514 is a sidewall of each perforated portion 554 far away from the opening 552. In this embodiment, each light incident surface is a flat plane and its normal line is substantially perpendicular to a normal line of the light-emitting surface 532.

The perforated portions 554 may perforate the light incident section 550; the shape of the perforated portions 554 are the same as that of the point light sources 514, hence, the point light sources 414 may be accommodated therein; the perforated portions 554 may be further used for limiting projecting angles of the light beams from the point light sources 514. In practical applications, each perforated portion 554 may be a slot recessed from a lower surface of the light incident surface 550, where the lower surface of the light incident surface 550 is a surface close to the bottom surface 102 while the lighting module 500 is assemble to the base 100.

The light incident section 550 of the light guide plate 520 is processed to give an optical pattern 556 on the upper or lower surface of the light incident section 550. The optical pattern 556 has multiple prism dots, and the number of the prism dots per unit area varies depending on the position of the light incident section 550, so that the light out from the light-emitting surface 532 has uniform luminance. The number of the prism dots per unit area increases inversely proportional to the amount of light arriving on the light incident section 550. In other words, the optical pattern 556 has less prism dots per unit area (i.e., a smaller density) at an area closer to the light incident surface where the point light sources 514 are disposed, and more prism dots per unit area (i.e., a larger density) at an area more distant from the light incident surface where the point light sources 514 are disposed. In FIG. 4, optical pattern on the light incident section 550 is in a shape of butterfly.

Reference again to FIG. 5 and FIG. 6; the light-reflecting section 570 connected to the light-emitting section 530 and the light incident surface 550 includes a light-reflecting surface 572. Light beams from the point light sources 514 are incident to the light guide plate 520 from the light incident surface 560 and guided to the light-reflecting section 570 distal from the point light sources 514. Notably, the light beams enter the light incident section 550 is totally internally reflected as they move to the light-reflecting surface 572 of the light-reflecting section 570 and then into the light-emitting section 530. An included angle between the light-reflecting surface 572 and a lower surface of the light incident section 550 is designed to make light beams incident to the light incident section 550 and emitted out from the light-emitting surface 532 of the light incident section 550 can be totally internally reflected by the light-reflecting section 570, and the included angle is, for example, 45±5 degrees.

With referring to FIG. 4 again, the light incident section 550 of the light guide plate 520 further includes a plurality of slots 558 separated from each other and extending radially outward from the center of the light incident section 550 to reduce undesirable hot spot defects caused by discrete point light sources 514. In this embodiment, the slots 558 perforated through the light incident section 550, and lengths of the slots 558 are varied when distance between the center of the light guide plate 520 and the light-emitting section 530 varies. More particularly, the length of the slots arranged along diagonal lines of the light guide plate 520 is greater than that not arranged along the diagonal lines.

The light guide plate 520 further includes an engaging part 560 extending from a sidewall of the light guide plate 520 and connected to the light-reflecting section 570 and the light-emitting section 530 for engaging to an assembling portion 110 formed on the base 100. The illuminant mouse pad 10 further includes a first fastening sheet 702 and a second fastening sheet 702 used for connecting the engaging part 560 to the assembling portion 110, and at least one screw is installed in the second sheet 704, the assembling portion 110, the engaging part 560, and the first sheet 702 accordingly and screwed in the first sheet 702.

In the present disclosure, the light guide plate 520 includes the light-reflecting section 570 formed between the light incident section 550 and the light-emitting section 530 to prevent the light beams generated by the point light sources 514 from directly emitting out of the light guide plate 520, and thus a hot spot phenomenon on the light-emitting surface 532 is suppressed.

Figure 7:
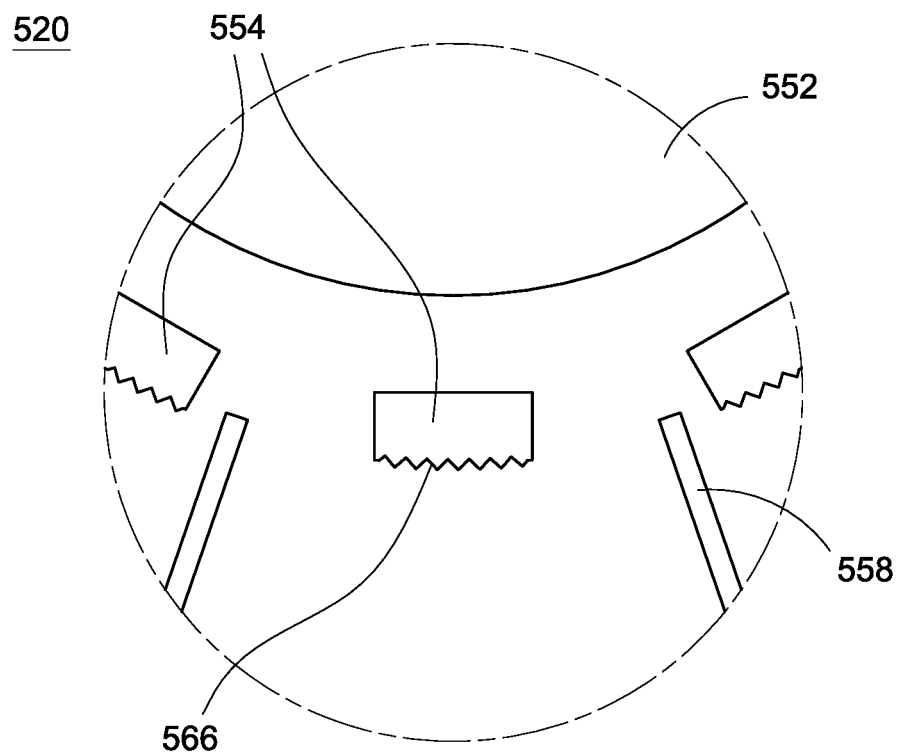
FIG. 7 is a partially enlarged view of a light guide plate according to a 2nd embodiment of the present disclosure.

Notably, the illuminant unit 510 of the illuminant mouse pad 10 is not limited to illuminate single light; in the other wards, the illuminant unit 510 of the present disclosure may illuminate light beams with different colors, hence, each point light source 514 may be the light emitting diode which has dies for generating red, green, and blue light beams; the driving circuit 518 may drive the point light source 514 for illuminating one or all of the red, green, and blue light beams to make the illuminant mouse pad more colorful. The light incident surface can be processed to give a plurality of microstructures for improving the effect of light mixing; the microstructures are, for example, zigzag microstructures shown in FIG. 7.

Figure 8:
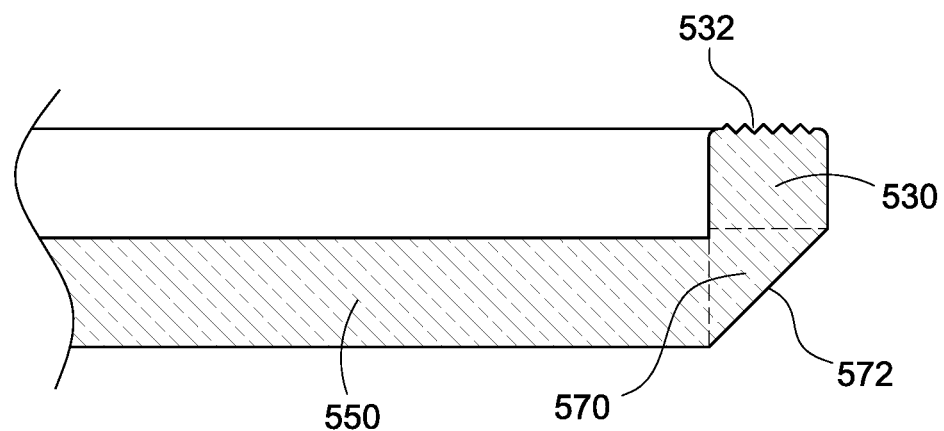
FIG. 8 is a sectional view of the light guide plate according to a 3rd embodiment of the present disclosure.
Figure 9:
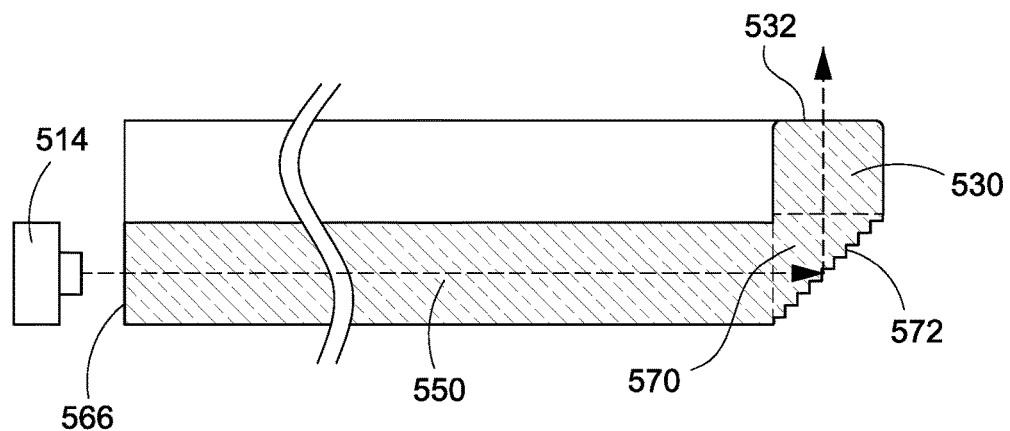
FIG. 9 is a sectional view of a lighting module according to a 4th embodiment of the present disclosure.

In addition, the light-emitting surface 532 may be processed to give a zigzag texture for improving uniformity, as shown in FIG. 8. The light-reflecting surface 572 may also be processed to give a zigzag texture for suppressing hot shot and enlarging projecting angle of light beams emitting out from the light-emitting surface 532, as shown in FIG. 9.

Figure 10:
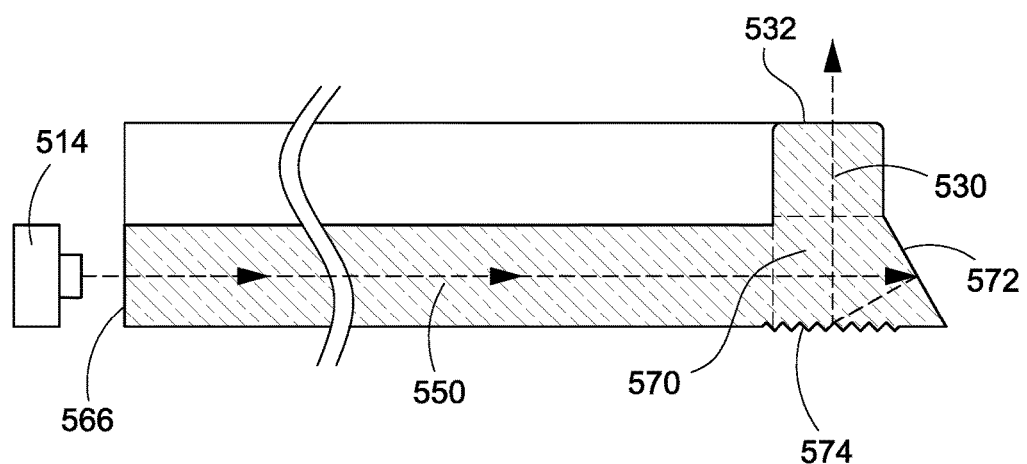
FIG. 10 is a sectional view of a lighting module according to a 5th embodiment of the present disclosure.

Reference is made to FIG. 10, which is a sectional view of a lighting module according to a 5th embodiment of the present invention. In FIG. 10, the lighting module 500 includes a plurality of point light sources 514 and a light guide plate 520; the light guide plate 520 includes a light-emitting section 530, a light incident section 550, and the light-reflecting section 570; the light-reflecting section 570 is connected to the light-emitting section 530 and the light incident section 550 and includes a light-reflecting surface 572 and a light-deflecting surface 574. The light-reflecting surface 572 faces the light incident surface 566, and the light-deflecting surface 574 faces the light-emitting surface 532. The point light sources 514 are disposed adjacent to the light incident surface 566; light beams from the point light sources 514 are incident to the light incident section 550 of the light guide plate 520 through the light incident surface 566 and emitted out from the light-emitting surface 532 of the light-emitting section 530 after the light beams are converged by the light-reflecting surface 572 and the light-deflecting surface 574 accordingly.

In FIG. 10, the light-deflecting surface 574 can be processed to give a zigzag texture for enlarging projecting angle of light beams emitting out from the light-emitting surface 532.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A lighting module, comprising:
   a plurality of point light sources; and
   a light guide plate having a light-emitting section, a light incident section, and a light-reflecting section, wherein the light-reflecting section is connected to the light-emitting section and the light incident section and comprises a light-reflecting surface, light beams from the point light sources are incident to the light guide plate through the light incident section and emitted out from a light-emitting surface of the light-emitting section after the light beams are conveyed by the light-reflecting surface,
   wherein an included angle between the light-reflecting surface and a lower surface of the light incident section is 45±5 degrees;
   wherein the light incident section includes a plurality light incident surfaces, the point light sources are disposed adjacent to the light incident surfaces, and a normal line of each light incident surfaces is disposed in respective orientation perpendicular to a normal line of the light-emitting surface;
   wherein the light incident section further comprises a plurality of perforated portions, the point light sources are disposed within the perforated portions, and a sidewall of each perforated portion is the light incident surface;
   wherein the perforated portions are arranged in an annular shape on a center of the light incident section;
   wherein the light incident section further comprises a plurality of slots, and each slot is disposed between two adjacent perforated portions;
   wherein lengths of the slots are increased when distances between the light incident surface and the light-emitting section increases.

2. The lighting module of claim 1, wherein the light incident surfaces comprise a plurality of microstructures.

3. The lighting module of claim 1, wherein at least one of the light-emitting surface and the light-reflecting surface comprising a textured structure.

4. The lighting module of claim 1, wherein the light-reflecting section further comprises a light-deflecting surface facing the light-emitting surface, the light-reflecting surface faces the light incident surface, light beams from the point light sources are incident to the light incident section and emitted out from the light-emitting surface after light beams are conveyed by the light-reflecting surface and the light-deflecting surface accordingly.

5. The lighting module of claim 4, wherein a texture structure is formed on the light-deflecting surface.

6. An illuminant mouse pad, comprising:
a base comprising a receiving part;
a lighting module, disposed in the receiving part and comprising:
a plurality of point light sources; and
a light guide plate having a light-emitting section, a light incident section, and a light-reflecting section, wherein the light-reflecting section is connected to the light-emitting section and the light incident section and comprises a light-reflecting surface, light beams from the point light sources are incident to the light guide plate through the light incident section and emitted out from a light-emitting surface of the light-emitting section after light beams are conveyed by the light-reflecting surface; and
a mat partially covering the lighting module and exposing the light-emitting surface,
wherein an included angle between the light-reflecting surface and a bottom surface of the light incident section is 45±5 degrees;
wherein the light incident section comprises a plurality of light incident surfaces, the point light sources are disposed adjacent to the light incident surfaces, and a normal line of each light incident surfaces is disposed in respective orientation perpendicular to a normal line of the light-emitting surface;
wherein the light incident section further comprises a plurality of perforated portions, the point light sources are disposed within the perforated portions, and a side wall of each perforated portion is the light incident surface;
wherein the perforated portions are arranged in an annular shape on a center of the light incident section;
wherein the light incident section further comprises a plurality of slots, and each slot is disposed between two adjacent perforated portions;
wherein lengths of the slots are increased when distances between the light incident surface and the light-emitting section increase.

7. The illuminant mouse pad of claim 6, wherein an upper surface of the mat and the light-emitting surface of the light guide plate are substantially at the same horizontal level.

8. The illuminant mouse pad of claim 6, wherein the light incident surfaces comprise a plurality of microstructures.

9. The illuminant mouse pad of claim 6, wherein at least one of the light-emitting surface and the light-reflecting surface comprising a textured structure.

10. The illuminant mouse pad of claim 6, wherein the light-reflecting section further comprises a light-deflecting surface facing the light-emitting surface, the light-reflecting surface faces the light incident surface, light beams from the point light sources are incident to the light incident section and emitted out from the light-emitting surface after light beams are conveyed by the light-reflecting surface and the light-deflecting surface accordingly.

11. The illuminant mouse pad of claim 10, wherein a texture structure is formed on the light-deflecting surface.

* * * * *